United States Patent
Argast et al.

(10) Patent No.: US 6,316,762 B1
(45) Date of Patent: Nov. 13, 2001

(54) OPTOELECTRONIC DEVICE

(75) Inventors: Martin Argast, Huelben; Siegfried Fauth, Kirchheim/Teck; Harald Löffler, Solingen, all of (DE)

(73) Assignee: Leuze Electronic GmbH & Co., Owen/Teck (DE)

( * ) Notice: Subject to any disclaimer, the term of this patent is extended or adjusted under 35 U.S.C. 154(b) by 0 days.

(21) Appl. No.: 09/341,269
(22) PCT Filed: Nov. 9, 1998
(86) PCT No.: PCT/EP98/07136
   § 371 Date: Jul. 7, 1999
   § 102(e) Date: Jul. 7, 1999
(87) PCT Pub. No.: WO99/24850
   PCT Pub. Date: May 20, 1999

(30) Foreign Application Priority Data

Nov. 7, 1997 (DE) .............................................. 197 49 199
Mar. 10, 1998 (DE) .............................................. 198 10 231

(51) Int. Cl.$^7$ ...................................................... G01V 8/14
(52) U.S. Cl. .................. 250/214 R; 250/221; 250/222.1
(58) Field of Search ............................ 250/214 R, 214.1, 250/225, 221, 222.1; 340/556, 555; 345/175

(56) References Cited

U.S. PATENT DOCUMENTS

| | | | |
|---|---|---|---|
| 4,224,608 | * 9/1980 | Lederer | 340/556 |
| 4,339,660 | * 7/1982 | Buchholz et al. | 250/221 |
| 4,710,760 | * 12/1987 | Kasday | 345/175 |
| 4,734,575 | * 3/1988 | Wagli et al. | 250/221 |
| 4,847,448 | * 7/1989 | Müller et al. | 250/225 |
| 4,847,488 | 7/1989 | Müller | 250/225 |

FOREIGN PATENT DOCUMENTS

| | | |
|---|---|---|
| 3514643A1 | 10/1986 | (DE) . |
| 3733656C1 | 2/1989 | (DE) . |
| 4238116A1 | 6/1994 | (DE) . |
| 4343457C1 | 10/1994 | (DE) . |
| 19621120C1 | 5/1997 | (DE) . |
| 0310932A2 | 4/1989 | (EP) . |

* cited by examiner

*Primary Examiner*—John R. Lee
(74) *Attorney, Agent, or Firm*—Venable; Norman N. Kunitz; George H. Spencer

(57) ABSTRACT

The invention relates to an optoelectronic device (1) for detecting objects (2) in a monitoring range, one end of which comprises a transmitter (3) that emits transmitting light rays (8) and two receivers (4, 5) that receive light rays (10) and have respectively one first and second linear polarizing element (14, 15) installed in front, for which the polarization directions are such that they are turned relative to each other by an angle $\alpha$ in the range of $45°<\alpha<135°$, while the other end has a reflector unit (9), comprising a reflector (17) with a third linear polarizing element (16) installed in front, for which the polarization direction essentially coincides with the polarization direction of the first or second polarizing element (14, 15). The receiving signals present at the outputs of the receivers (4, 5) are respectively assigned two different threshold values S1 and S2 (S2>S1), for which the interval is selected such that the receiving signal of a receiver (4) is above S2 and the receiving signal of the second receiver (5) is below S1, but only for a clear optical path. Means for testing the device (1) are provided which, when activated, cause the receiving signals of the receivers (4, 5) to assume predetermined switching states with respect to the threshold values S1 and S2, that is during an error-free operation. Alternatively, the quotient of the receiving signals for receivers 4, 5 can also be assigned a threshold value S.

18 Claims, 4 Drawing Sheets

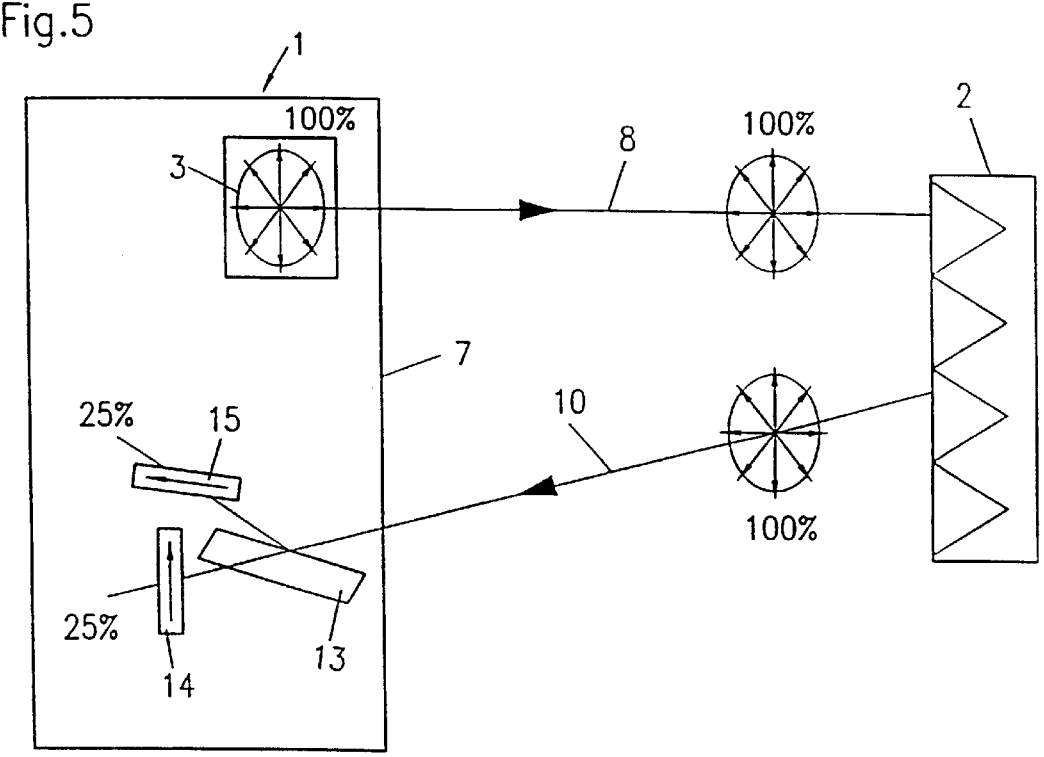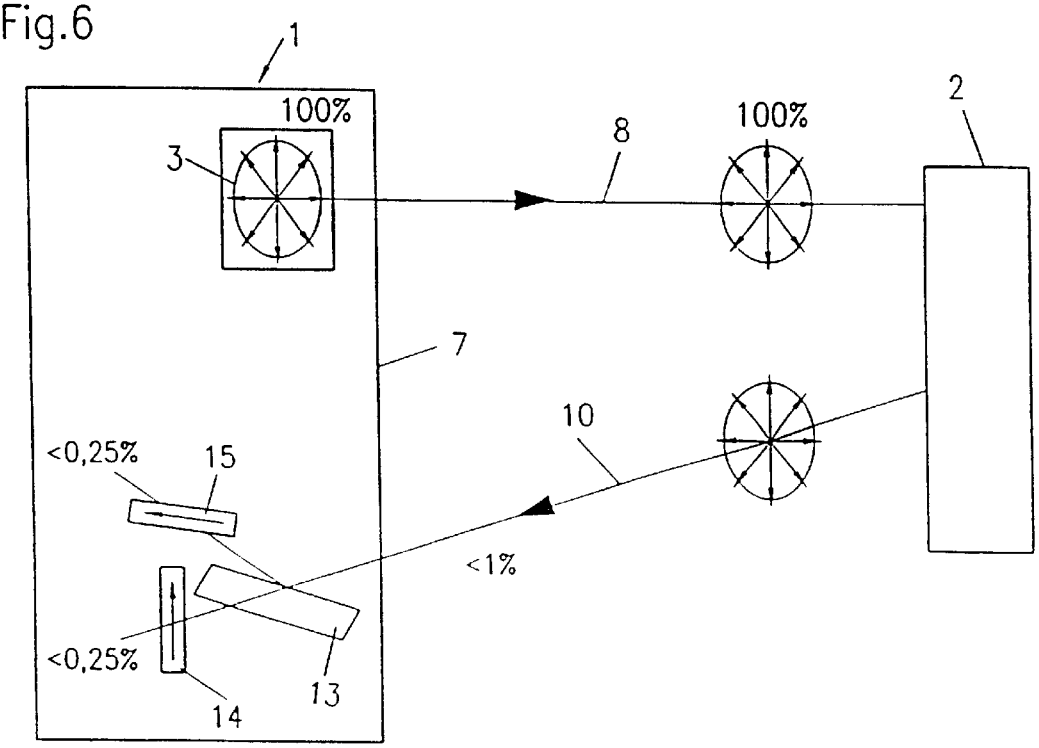

OPTOELECTRONIC DEVICE

BACKGROUND OF THE INVENTION

Figure 1:
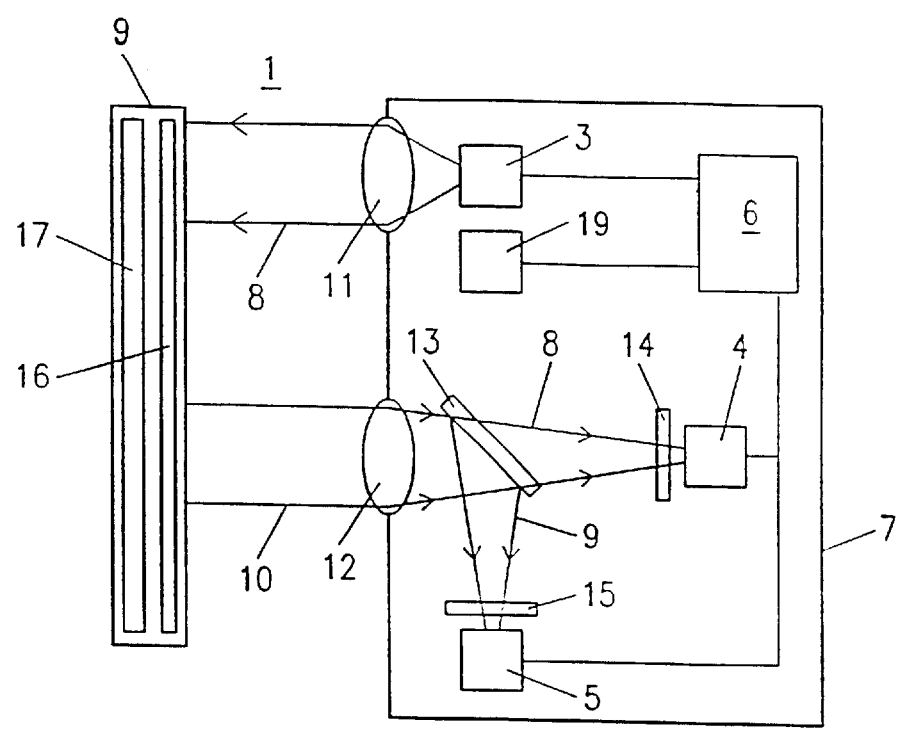

The invention relates to an optoelectronic device for detecting objects in a monitoring range, with one end of the range being provided with a transmitter that emits transmitting light rays and two receivers for receiving light rays that have respectively a first and a second linear polarizing element installed in front, for which the polarization directions are turned relative to each other by an angle $\alpha$ in the range of $45°<\alpha<135°$, while the other end of the range has a reflector unit, comprising a reflector and a third linear polarizing element that is installed in front, for which the polarization direction essentially coincides with the polarization direction of the first or second polarizing element.

Such a device is known from the German Patent 42 38 116. This device concerns a reflection light barrier with two receivers, having a beam-dividing, partially transmitting reflector installed in front as polarizing means. The polarizing device for the receiving light rays that penetrate the partially transmitting reflector and arrive at the first receiver and the polarizing device for the receiving light rays that are reflected at the partially transmitting reflector and arrive at the second receiver are turned such that they are displaced by 90° to each other. The difference between the receiving signals present at the receiver outputs is formed to identify objects in the monitoring range. A value is assigned to this signal difference by means of a threshold value.

It is the object of the invention to design a device of the aforementioned type in such a way that it can be used in the area of protection for persons.

SUMMARY OF THE INVENTION

The above object generally is achieved according to the invention by an optoelectronic device for detecting objects in a monitoring range, one end of which is provided with a transmitter that emits transmitting light rays and two receivers for receiving light rays that have respectively a first and a second linear polarizing element installed in front, for which the polarization directions are turned relative to each other by an angle $\alpha$ in the range of $45°<\alpha<135°$, while the other end has a reflector unit, comprising a reflector and a third linear polarizing element that is installed in front, for which the polarization direction essentially coincides with the polarization direction of the first or second polarizing element, and wherein receiving signals present at the outputs of the receivers are assigned respectively two different threshold values S1 and S2 (S2>S1), the distance between the receiver is selected such that only with a clear beam path is the receiving signal of one receiver above S2 and the receiving signal of the second receiver below S1, means are provided for testing the device and by actuating these means during an error-free operation, the receiving signals of the receivers will assume predetermined switching states with respect to the threshold values S1 and S2. Advantageous embodiments and useful modifications of the invention are described and disclosed.

In accordance with a first alternative of the invention, the receiving signals present at the receiver outputs are respectively assigned two different threshold values S1 and S2, wherein the threshold value S2 is higher than S1. The interval between threshold values is selected such that the signal received by one receiver is above S2 and the signal received by the other receiver is below S1, but only with a clear optical path. As an alternative, the output signals at the receivers can also be assigned separate threshold values. In that case, the receiving signals for the threshold values are amplified differently by means of amplifiers, wherein the difference in the amplification factors corresponds to the difference in the threshold values S1 and S2. In principle, it would also be conceivable that the signals received by the receivers are respectively assigned the same threshold value for the same amplification. However, it would then be impossible to differentiate safely and unambiguously between the signals for a clear optical path and the signals for an optical path with object located therein.

In that case, the signal received by the receiver having a polarizing element with the same or nearly the same polarization direction as the polarizing element for the reflector unit is located above S2. The polarizing element of the other receiver is turned by an angle $\alpha$ in the range of $45°<\alpha<135°$, preferably 90°, relative to the polarization direction of the polarizing element of the reflector unit. Consequently, only a small amount of light impinges on this receiver if the optical path is clear.

This device makes it possible to detect with certainty all types of objects that depolarize the impinging light. Comparable amounts of light arrive at the receiver owing to the depolarizing effect of the object.

A diffuse and extremely weak reflection of the light by the object means that the signals received by both receivers are below the threshold value S1.

If a strongly reflecting object is located in the optical path, a large amount of light arrives at the receivers so that their receiving signals are respectively above S2.

In any case, the switching states at the receiver outputs deviate from the switching states for a clear optical path, so that a secure detection of the objects is ensured.

In accordance with another alternative of the invention, the quotient of the signals present at the receiver outputs is formed. Forming the quotient will eliminate systematic measuring errors, which result from differences in the dimensions of the monitoring range. Thus, it is preferable to form a quotient of the receiving signals rather than to form a difference, which is also conceivable in principle. The quotient of the receiving signals is assigned a threshold value S. This threshold value S is selected such that for a clear optical path of the device, a different switching state results than if an object is located in the optical path, that is to say independent of its reflective characteristics. In addition, the signals received by the receiver are valued individually with the threshold value S1.

The device according to the invention additionally comprises means for testing, which can be used to test the operability of the transmitter and the receiver, either cyclically or at predetermined intervals. The test is carried out in such a way that when actuating the testing means during an error-free operation, the signals received by the receivers must occupy predetermined switching states with respect to the threshold values S1 and S2 or the threshold value S.

Internal equipment malfunctions can be detected and displayed immediately as a result of this testing. When used in the field of protection of persons, the device is normally used to monitor a machine or the like. If an internal equipment malfunction occurs in the device, the machine is turned off for safety reasons.

BRIEF DESCRIPTION OF THE PREFERRED EMBODIMENTS

Figure 2:
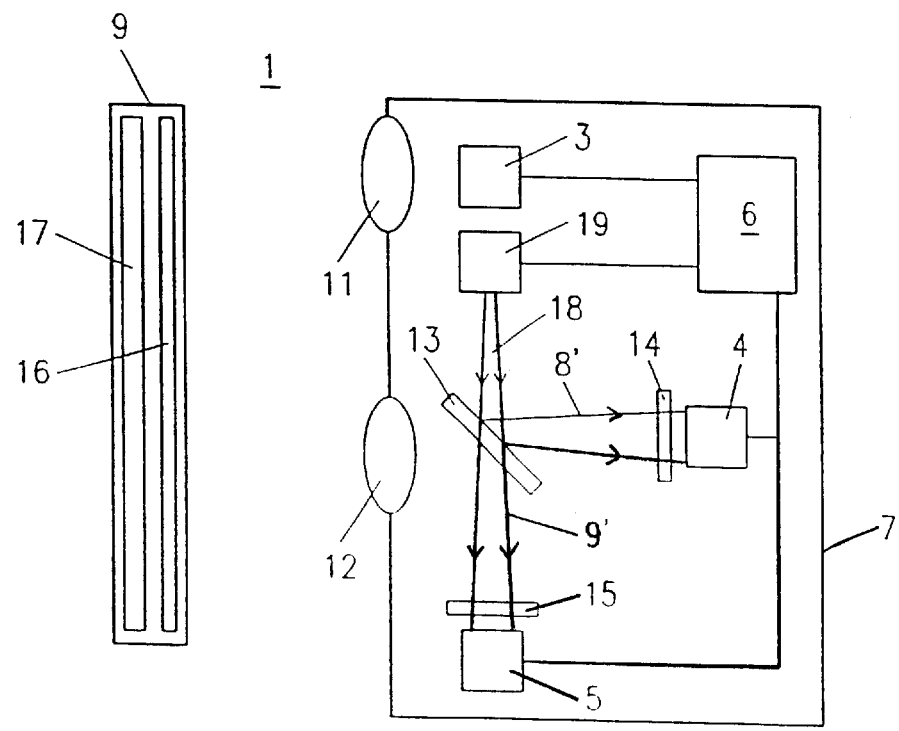
Figure 3:
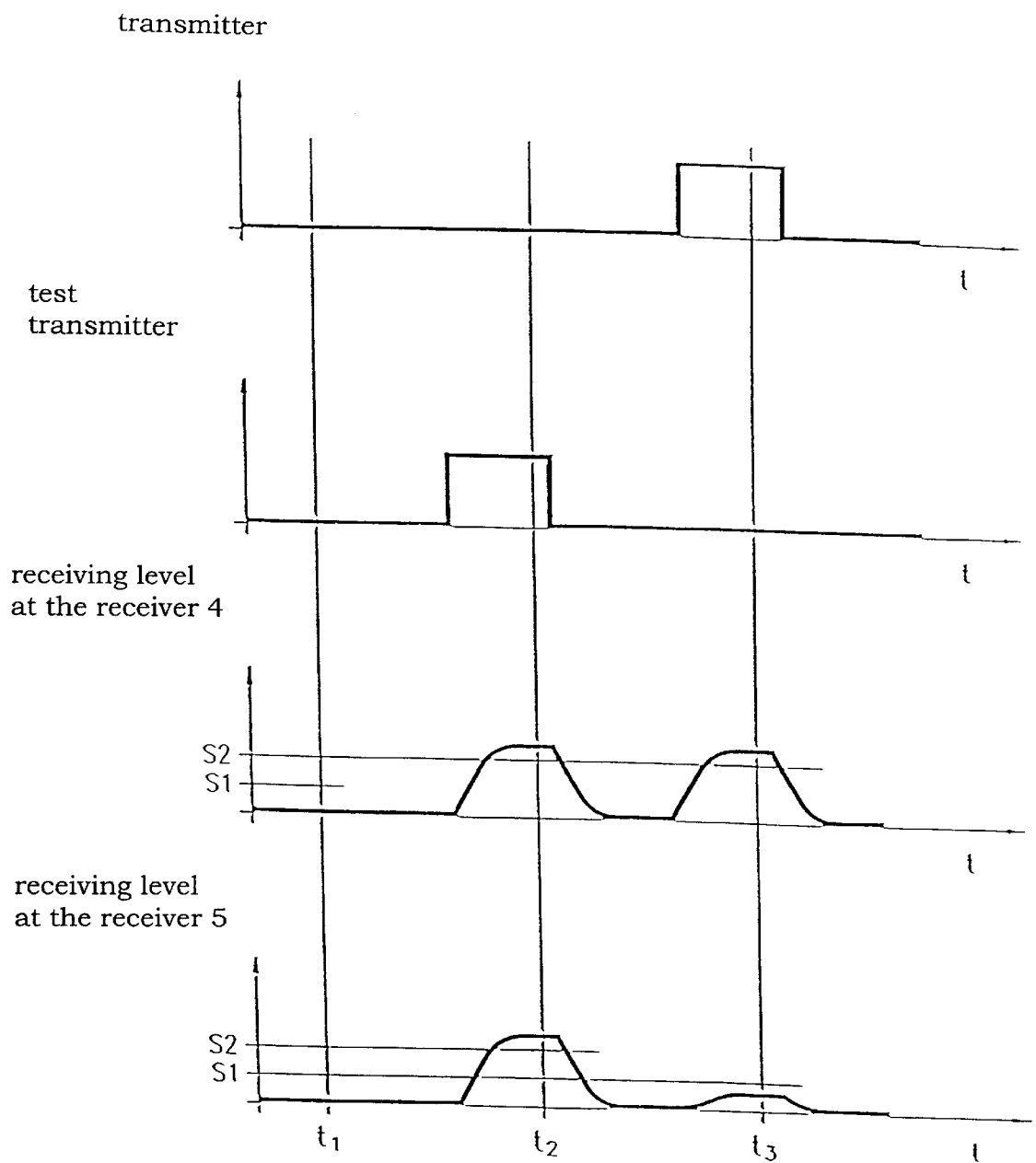
Figure 4:
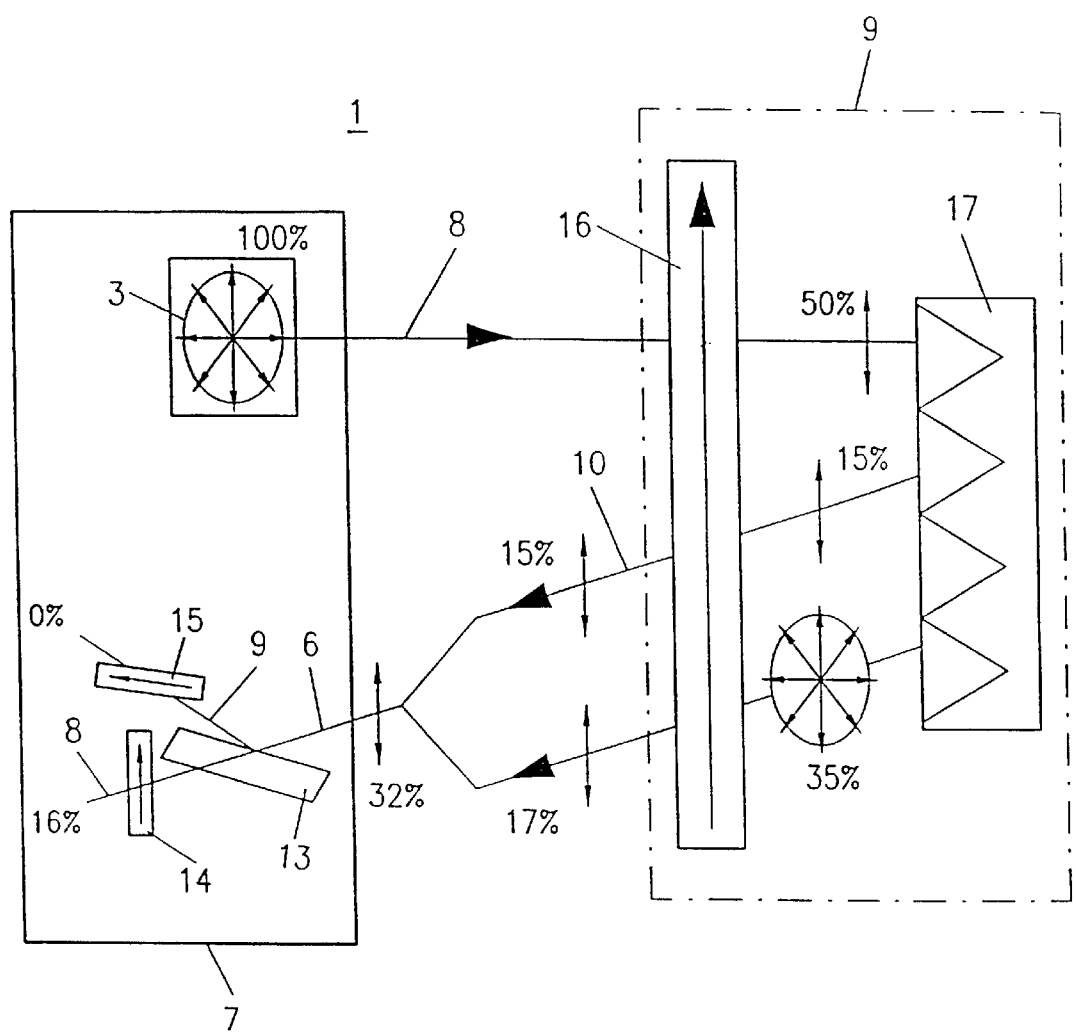

The invention is explained in the following with the aid of drawings. Shown are in:

FIG. 1: A schematic representation of an exemplary embodiment of the device according to the invention, with activated transmitter;

FIG. 2: A device according to FIG. 1 with the transmitter turned off and the test transmitter turned on;

FIG. 3: A pulse diagram showing the operation of the transmitter, the test transmitter and the receivers;

FIG. 4: A schematic representation of the intensity curves for transmitting light rays and receiving light rays with a clear optical path;

FIG. 5: A schematic representation of the intensity curves for the transmitting light rays and the receiving light rays if a specular object is arranged in the optical path;

FIG. 6: A schematic representation of the intensity curves for the transmitting light rays and the receiving light rays for a diffuse reflecting object arranged in the optical path.

DETAILED DESCRIPTION OF THE PREFERRED EMBODIMENTS

The FIGS. 1 and 2 show a first exemplary embodiment of an optoelectronic device 1 for detecting objects 2 in an area to be monitored. A transmitter 3 and two receivers 4, 5 are arranged at one end of the monitoring area. These are connected to a joint evaluation unit 6 and are integrated into a housing 7. The transmitter 3 is preferably a light-emitting diode with pulsed-mode operation. As an alternative, the transmitter 3 can be a laser as well. The receivers 4, 5 are preferably identically designed photodiodes. The evaluation unit 6 consists of a microcontroller or is integrated into an ASIC (application specific integrated circuit).

With a clear optical path, the transmitting light rays 8 emitted by the transmitter 3 are conducted to a reflector unit 9 that is arranged at the opposite end of the monitoring area. The receiving light rays 10 reflected there are conducted to the receivers 4, 5.

The transmitting light rays 8 pass through a transmitting optic 11 that is attached to the front wall of housing 7. The housing wall additionally contains a receiving optic 12 through which the receiving light rays 10 pass. Separate lenses form the transmitting optic 11 and the receiving optic 12.

A beam dividing, partially transmitting mirror 13 is provided between the receiving optic 12 and the receivers 4, 5. The front face and the rear face of this mirror are respectively at a 45° angle, relative to the beam axis of the occurring receiving light rays 10. The receiving light rays 10 that pass through the receiving optic 12 strike the front face of the partially transmitting mirror 13. A segment of the receiving light rays 10 penetrates the partially transmitting mirror 13 and strikes the receiver 4, which is arranged behind it. The remaining segment of the receiving light rays 10 is reflected at the partially transmitting mirror 13 and strikes the second receiver 5.

A linear polarizing element 14, 15 is installed in front of each receiver 4, 5 and is preferably designed as polarization filter.

In another embodiment of the invention, which is not shown, a deflection element is installed in front of the partially transmitting mirror 13. The transmitting light rays 8 are deflected at this deflection element, such that they are conducted coaxial to the receiving light rays 10 in the monitoring area. It makes sense if the monitoring element consists of another partially transmitting mirror 13, the reflecting surface of which extends parallel to the reflecting surface of the first partially transmitting mirror 13. The transmitter 3 is arranged below the second partially transmitting mirror 13. In that case only one lens is needed, which simultaneously focuses the transmitting light rays 8 and the receiving light rays 10.

The reflector unit 9 has an additional linear polarizing element 16, arranged directly in front of a reflector 17, which can be designed as triple reflector or as reflecting foil. In principle, a mirror can also be used in place of a reflector 17.

The polarization direction of the polarizing elements 14, 16 in the reflector unit 9 and at the first receiver 4 essentially coincide, preferably with an angle difference of less than 10°. In the present exemplary embodiment, the polarization directions coincide exactly. The polarization direction of the polarizing element 15 at the second receiver 5 is turned relative hereto by an angle $\alpha$ in the range of $45°<\alpha<135°$. In the present exemplary embodiment, the angle $\alpha=90°$.

If a laser is used for the transmitter 3, the transmitting light rays 8 have a linear polarization. In that case, the polarization direction of the rays is turned by 45°, relative to the polarization direction of the polarizing element 16.

The receiving signals present at the outputs of receivers 4, 5 are respectively assigned two threshold values S1 and S2, wherein the threshold value S2 is above the value S1. The switching state of device 1 is defined by the position of the receiving signals at the receivers 4, 5, relative to the threshold values S1 and S2.

The threshold values are selected in dependence on the polarization directions of the polarizing elements 14, 15.

In particular, the distance between the threshold values S1 and S2 is selected such that the receiving signal of the first receiver 4 is located above S2 while the receiving signal of the second receiver 5 is simultaneously located below S1, but only with a clear optical path. With a clear optical path, this can be realized in that the threshold value S2 is approximately 10% below the receiving level of the first receiver 4 and that the threshold value S1 is approximately 80% below this receiving level.

The FIGS. 4–6 show the light output and polarization direction along the beam paths for transmitting light rays 8 and receiving light rays 10. Possible damping losses during the passage through the optical elements are neglected in this case.

FIG. 4 shows the optoelectronic device 1 with a clear optical path. The transmitting light rays 8, emitted by the transmitter 3, are not polarized, which is illustrated by the even distribution of arrows. The transmitting output emitted by the transmitter 3 is used as reference point for the further beam course and is set at 100%.

The transmitting light rays 8 fall on the linear polarizing element 16 of reflector unit 9, for which the polarization direction is illustrated with a vertical arrow.

It is only the share of transmitting light that is polarized in this polarization direction which penetrates the polarizing element 16. This share amounts to approximately 50% of the original transmitting output.

The transmitting light rays 8 subsequently strike the reflector 17 and are reflected there, wherein these rays are in part depolarized. In the case shown in FIG. 4, a share of 35% is depolarized, while a share of 15% retains the polarization direction. During the second passage through the polarizing element 16, this share is not weakened since this polarization direction coincides with the polarization direction of the polarizing element 16. On the other hand, the depolarized share is weakened from 35% to 17%. Thus, from the originally emitted transmitting output, a share of 32% of linear polarized light arrives at the partially transmitting mirror 13, wherein half of the transmitting light rays 8 are reflected and the other half penetrates the mirror 13.

The share of the receiving light rays 10 penetrating the mirror 13 falls on the polarizing element of the first receiver 4. The polarization direction of this element coincides with that of the transmitting light rays 8, so that these rays can pass without further weakening through the first polarizing element 14 and onto the receiver 4. This share amounts to 16% of the original transmitting output.

Since the polarization direction of polarizing element 15 in front of the second receiver 5 is turned by 90°, relative to the arriving receiving light rays 10, no receiving light strikes the second receiver 5.

Corresponding to the amounts of light striking the receivers 4, 5, the receiving signal at the output of the first receiver 4 is above the threshold value S2 and the receiving signal at the output of the second receiver 5 is below the threshold value S1.

In the case represented in FIG. 5, a highly reflective object 2 is arranged in the optical path, in front of the non-depicted reflector unit 9. The object 2 is a reflector 17 on which the transmitting light rays 8, reflected by the transmitter 3, are reflected nearly without loss. The depolarized transmitting light rays 8, emitted by the transmitter 3, remain depolarized even after being reflected at the reflector 17.

The receiving light rays 10 that are reflected at the reflector 17 strike the partially transmitting mirror 13, wherein respectively equal shares of the receiving light are conducted from there in the direction of the two receivers 4, 5. Since the receiving light is depolarized, it is weakened by about 50% when passing through the polarizing elements 14, 15. That is why respectively about 25% of the original transmitting output arrives at the receivers 4, 5.

The individual signals received at receivers 4, 5 are consequently above the threshold value S2. These receiving signals differ clearly from the switching states during the clear optical path, so that a secure detection of the object 2 is ensured.

In the case shown in FIG. 6, a diffusely reflecting object 2 is arranged in the optical path in front of the non-depicted reflector unit 9. As a result of the diffuse reflection, only a small share of the transmitted light falling on the object 2, typically less than 1% of the originally emitted transmitting light output, is detected by the receiving optic 12. The amounts of light arriving at the receivers 4, 5 are therefore correspondingly low. Otherwise, the beam path corresponds to the one shown in FIG. 5, particularly with respect to the polarization conditions.

Owing to the fact that only a share of less than 0.25% of the originally emitted transmitting light output arrives at the receivers 4, 5, the receiving signals are respectively below the threshold value S1. These switching states also clearly differ from the switching states for the clear optical path, so that a secure detection of the object is ensured in this case as well.

In accordance with another alternative of the invention, the quotient of the receiving signals is formed in the evaluation unit 6. In the present case, the value of the receiving signal at the receiver 4 is divided by the value of the receiving signal at the receiver 5. With a clear optical path, the quotient will have a numerical value of x>>1. If an object 2 with optional reflection degree is arranged in the optical path, a quotient with a numerical value in the range of x=1 results. In order to ensure a secure detection of the objects 2, the threshold level is approximately in the range of $2<S\leq10$. Consequently, it is ensured that the threshold value S is exceeded only during a clear optical path. In addition, the signals received at the receiver 4, 5 are individually assigned the threshold value S1.

Testing means are provided to check the operational safety of device 1. If these means are actuated during an error-free operation of device 1, the receiving signals of receivers 4, 5 assume predetermined switching states with respect to the threshold values S1 and S2 or the threshold value S. This subsequently checked in the evaluation unit 6.

This testing can occur cyclically, wherein the testing is periodically activated in the evaluation unit 6, at specific time intervals in the range of microseconds. Such a cyclical testing occurs if the safety requirements for the device 1 are particularly high.

If the safety requirements for the device 1 are less stringent, the testing can occur within longer time intervals, which are typically in the range of hours. The testing in that case is preferably triggered by an external switching device, which is connected to the device 1. It makes sense for the testing to occur if the device 1 and/or the machine to which the device 1 is connected for monitoring purposes is being maintained or is not in operation.

With the exemplary embodiments shown in FIGS. 1 and 2, a test transmitter 19, which transmits test transmitting light rays 18, is provided as means for testing. The test transmitting light rays 18 are conducted completely inside the housing 7 and are transmitted via the beam-dividing, partially transmitting mirror 13 to the receivers 4, 5. The test transmitting light rays 18 in this case strike the back of the partially transmitting mirror 13. A share of approximately 50% of the test transmitting light rays 18 is reflected from there to a first receiver 4. The remaining share of the transmitting light rays 18 passes through the partially transmitting mirror 13 and impinges on the second transmitter 5.

FIG. 3 illustrates how this testing is accomplished. The transmitter 3 preferably remains switched off during the testing. Alternatively, the transmitter 3 could also remain switched on since it only increases the effect of the test transmitter 19, but does not interfere with it. The testing is divided into two test measurements. The transmitter 3 as well as the test transmitter 19 remain switched off during the first test measurement ($t_1$). Owing to the fact that the device 1 does not emit light in this case, the receiving signals from the receivers 4, 5 must be below the threshold value S1 during an error-free operation. In the ideal case, the receiving signal levels assume the value zero.

In the actual case, the receiving signal levels are above zero, primarily because of the noise in the receivers 4, 5.

If a malfunction occurs and one of the receiving signals is above the threshold value S1, the respective receiver 4 or 5 is defective. If this concerns the first receiver 4, it also may not be possible to switch off the transmitter 3, since this signal combination corresponds to the operation of the device 1 with a clear optical path. If both receiving signals are above the threshold values S1 and S2, the transmitter 3 or the test transmitter 19 cannot be switched off and/or both receivers 4, 5 are defective.

During the second test measurement ($t_2$), the transmitter 3 is switched off and the test transmitter 19 is switched on. In the process, the test transmitter 19 emits unpolarized test transmitting light rays 18, equal shares of which are transmitted via the beam-dividing mirror 13 to the receivers 4, 5. Since this is depolarized light, the test transmitting light rays 18 are weakened equally during the passage through the polarizing elements 14, 15. The transmitting output is selected such that if there is no malfunction, the receiving signals from both receivers 4, 5 are above the threshold value S2.

If the receiving signal from a receiver 4, 5 is below the threshold value S2, this receiver 4, 5 is defective.

Thus, by linking the results from both test measurements, it can be determined whether the transmitter 3 or the test transmitter 19 or one of the receivers 4, 5 are defective.

At the completion of the test measurements, the device 1 again switches to the operating mode. In the operating mode, the transmitter 3 is switched on and the test transmitter 19 is switched off. This is shown with $t_3$ in FIG. 3 for the case of a clear optical path.

In another exemplary embodiment, which is not shown here, a polarizing element 15 is provided as testing means in front of the receiver 4, 5, that is in place of the test transmitter 19. The polarizing effect of this means can be changed.

In the present exemplary embodiment, this polarizing element 15 consists of a liquid crystal element. The liquid crystal element can be switched between two states by applying different voltages. In the first state, the liquid crystal element has a linear polarization effect. This state is assumed during the operating phase, in which the transmitter 3 is activated. The state of device 1 at $t_3$ in FIG. 3, for example, corresponds to this state.

During the testing, the liquid crystal element switches to the second state. In this state, the liquid crystal element no longer has any polarizing effect.

The testing again occurs in two separate test measurements. The first test measurement takes place analog to the exemplary embodiment while the transmitter 3 is switched off. Correspondingly, the signals received by the receivers 4, 5 must be below S1 in the error-free state.

During the second test measurement, the transmitter 3 is activated. It makes sense if the test measurement occurs with a clear optical path. The intensity conditions and the polarization directions of the transmitting light rays 8 and the receiving light rays 10 essentially correspond to the case shown in FIG. 4. The only difference is that the receiving light rays 10 are no longer weakened when passing through the polarizing element 15 formed by the liquid crystal element. Accordingly, the same amount of light falls on this receiver 5 as falls on the receiver 4. Thus, the receiving signals from both receivers 4, 5 are above the threshold value S2 in the error-free case.

The evaluation as to whether the transmitter 3 or one of the receivers 4, 5 is defective in case of an error is made in the same way as for the first exemplary embodiment.

According to the second alternative for the invention, the test measurements are carried out as follows. During the first test measurement (t1), the receiving signals of the receivers 4, 5 respectively must be below the threshold value S1 during an error-free operation. During the second test measurement (t2), the quotient of the receiving signals is assigned the threshold value S. The quotient of the signals received at the receivers 4, 5 in that case is below the threshold value S if the test transmitter 19 is activated.

What is claimed is:

1. An optoelectronic device for detecting objects in a monitoring range, one end of which is provided with a transmitter that emits transmitting light rays and first and second receivers for receiving light rays that have respectively a first and a second linear polarizing element installed in front, for which the polarization directions are turned relative to each other by an angle $\alpha$ in the range of $45°<\alpha<135°$, while the other end has a reflector unit, comprising a reflector and a third linear polarizing element that is installed in front, for which the polarization direction essentially coincides with the polarization direction of the first or second polarizing element, and wherein: the receiving signals present at the outputs of the receivers are assigned respectively two different threshold values S1 and S2 (S2>S1), the distance between the first and second receivers is selected such that only with a clear beam path is the receiving signal of the first receiver above S2 and the receiving signal of the second receiver below S1, that means are provided for testing the device including a test transmitter emitting test transmission light rays directed into the receivers, and by actuating the test transmitter during an error-free operation, the receiving signals of the receivers assume predetermined switching states with respect to the threshold values S1 and S2.

2. An optoelectronic device for detecting objects in a monitoring range, one end of which is provided with a transmitter that emits transmitting light rays and first and second receivers for receiving light rays that have respectively a first and second linear polarizing element installed in front, for which the polarization directions are turned relative to each other by an angle $\alpha$ in the range of $45°<\alpha<135°$, while the other end has a reflector unit, comprising a reflector and a third linear polarizing element that is installed in front, for which the polarization direction essentially coincides with the polarization direction of the first or second polarizing element, and wherein the quotient of the signals present at the receivers is formed and this quotient is assigned a threshold value S, and that means for testing the device are provided and comprises a test transmitter for emitting test transmitter signals that are directed toward the receivers, and the activation of the test transmitter causes the quotient of the receiving signals to assume a predetermined value relative to the threshold value S during an error-free operation.

3. An optoelectronic device according to claim 1, wherein the testing is realized cyclically.

4. An optoelectronic device according to 1, wherein the testing is triggered by an external activation of the test transmitter.

5. An optoelectronic device according to claim 1, wherein the polarization directions of the first and second polarizing elements are turned by $\alpha=90°$ relative to each other.

6. An optoelectronic device according to claim 5, wherein the receiving light rays are transmitted to the receivers via a beam-dividing, partially transmitting mirror.

7. An optoelectronic device according to claim 6, wherein a deflection element for reflecting the transmitting light rays is arranged in front of the partially transmitting mirror, so that light rays are conducted coaxially to the receiving light rays in the monitoring range.

8. An optoelectronic device according to claim 7, wherein the deflection element is a partially transmitting mirror.

9. An optoelectronic device according to claim 1, wherein the transmitter is a laser, wherein the polarization direction of the light rays emitted by the laser is turned approximately by 45° relative to the polarization direction of the linear polarizing element of the reflector unit.

10. An optoelectronic device according to claim 1, wherein the test transmitting light rays emitted by the test transmitter are transmitted via the partially transmitting mirror to the receivers.

11. An optoelectronic device according to claim 1, wherein the transmitter is shut down during the testing.

12. An optoelectronic device according to claim 10, wherein with an error-free operation of this device, the receiving signals of the receivers are respectively below the threshold value S1 during a first test measurement if the transmitter and the test transmitter are switched off.

13. An optoelectronic device according to claim 12, wherein with an error-free operation of said device and during a second test measurement with switched-off transmitter and switched-on test transmitter, the receiving signals of the receivers are respectively above the threshold value S2, or the quotient of the receiving signals of the receivers is below a threshold value S, wherein the receiving signal of the first receiver is divided by the receiving signal of the second receiver.

14. An optoelectronic device according to claim 1, wherein the polarization effect of the second polarizing element in front of the second receiver can be changed to test the device.

15. An optoelectronic device according to claim 14, wherein the polarizing element is a liquid crystal element.

16. An optoelectronic device according to claim 14, wherein the polarization effect of the second polarizing element is canceled out during the test measurements.

17. An optoelectronic device according to claim 16, wherein with an error-free operation of said device, the receiving signals of the receivers are below the threshold value S1 during a first test measurement with switched-off transmitter, and that they are above S2 during a second test measurement with switched-on transmitter and a clear optical path, or that the quotient of the receiving signals of receivers is below the threshold value S during the second test measurement, wherein the receiving signal of the first receiver is divided by the receiving signal of the second receiver.

18. An optoelectronic device according to claim 1, wherein the transmitter is a light-emitting diode.

* * * * *